United States Patent
Maor et al.

(10) Patent No.: US 12,010,125 B2
(45) Date of Patent: Jun. 11, 2024

(54) ANOMALY DETECTION IN AN APPLICATION WITH DELEGATE AUTHORIZATION

(71) Applicant: MICROSOFT TECHNOLOGY LICENSING, LLC, Redmond, WA (US)

(72) Inventors: Tal Joseph Maor, Seattle, WA (US); Idan Brusilovsky, Tel-Aviv (IS); Amir Ben Ami, Nehalim (IS); Amos Avraham Rimon, Tel-Aviv (IS); Adi Rose Lefkowitz, Tel-Aviv (IS)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 17/361,650

(22) Filed: Jun. 29, 2021

(65) Prior Publication Data

US 2022/0417265 A1    Dec. 29, 2022

(51) Int. Cl.
*H04L 29/06* (2006.01)
*H04L 9/40* (2022.01)

(52) U.S. Cl.
CPC .............. *H04L 63/1416* (2013.01)

(58) Field of Classification Search
CPC ............. H04L 63/1416; H04L 63/0815; H04L 63/1425
See application file for complete search history.

(56) References Cited

U.S. PATENT DOCUMENTS

| | | | | |
|---|---|---|---|---|
| 5,680,586 | A * | 10/1997 | Elkins ................. | G06F 9/45537 717/136 |
| 9,473,516 | B1 * | 10/2016 | Jezorek ................... | H04L 67/01 |
| 10,977,364 | B2 * | 4/2021 | Harris ................. | H04L 63/1425 |
| 11,032,270 | B1 * | 6/2021 | Tsarfati ............... | H04L 63/0281 |
| 11,457,040 | B1 * | 9/2022 | Sole ...................... | H04L 63/101 |

(Continued)

FOREIGN PATENT DOCUMENTS

EP    3687139 A2    7/2020

OTHER PUBLICATIONS

InnovationQ+ NPL Search (Year: 2023).*

(Continued)

*Primary Examiner* — Samson B Lemma
*Assistant Examiner* — Richard W Cruz-Franqui
(74) *Attorney, Agent, or Firm* — Shook, Hardy & Bacon L.L.P.

(57) ABSTRACT

Aspects of the technology described herein detect potential security breaches in delegate applications by monitoring communications received from a delegate application. Anomalies in the delegate application communications can indicate that the delegate application has been breached and is now being controlled by an entity other than an authorized entity. An anomaly may be a new or unusual attribute value within the delegate-application's communication. Initially, the anomaly detection system may build a baseline of attribute values for a single delegate application within a single tenant and separate baseline for the tenant. If the attribute value is anomalous to both the application-specific baseline and the tenant-specific baseline then the message may be designated as anomalous. Mitigation can then be undertaken.

20 Claims, 7 Drawing Sheets

(56) References Cited

U.S. PATENT DOCUMENTS

| | | | | |
|---|---|---|---|---|
| 2002/0194119 | A1* | 12/2002 | Wright | G06Q 20/10 |
| | | | | 705/38 |
| 2006/0282660 | A1* | 12/2006 | Varghese | G07F 7/1083 |
| | | | | 713/155 |
| 2008/0189788 | A1* | 8/2008 | Bahl | H04L 63/1416 |
| | | | | 726/25 |
| 2009/0254978 | A1* | 10/2009 | Rouskov | H04L 63/102 |
| | | | | 726/4 |
| 2010/0211548 | A1* | 8/2010 | Ott | G06F 16/27 |
| | | | | 707/655 |
| 2011/0004580 | A1* | 1/2011 | Varghese | G06N 20/00 |
| | | | | 709/224 |
| 2011/0276490 | A1* | 11/2011 | Wang | H04L 9/3236 |
| | | | | 705/317 |
| 2013/0125210 | A1* | 5/2013 | Felt | H04L 63/10 |
| | | | | 726/4 |
| 2013/0239166 | A1* | 9/2013 | MacLeod | G06F 21/6218 |
| | | | | 726/4 |
| 2015/0150110 | A1* | 5/2015 | Canning | H04L 63/0807 |
| | | | | 726/9 |
| 2015/0172314 | A1* | 6/2015 | Mononen | H04L 63/0815 |
| | | | | 726/8 |
| 2015/0180894 | A1* | 6/2015 | Sadovsky | H04W 12/12 |
| | | | | 726/22 |
| 2016/0028737 | A1* | 1/2016 | Srinivasan | H04L 63/0807 |
| | | | | 726/4 |
| 2016/0359862 | A1* | 12/2016 | Riva | H04W 12/088 |
| 2016/0381060 | A1* | 12/2016 | Floering | H04L 61/4511 |
| | | | | 726/25 |
| 2017/0111383 | A1* | 4/2017 | Most | H04L 63/1416 |
| 2017/0155686 | A1* | 6/2017 | Yanacek | G06F 21/6218 |
| 2018/0083967 | A1* | 3/2018 | Subramanian | H04L 63/10 |
| 2018/0124073 | A1* | 5/2018 | Scherman | H04L 63/1491 |
| 2019/0258799 | A1* | 8/2019 | Harris | G06F 21/552 |
| 2019/0394204 | A1* | 12/2019 | Bansal | H04L 63/0815 |
| 2020/0336508 | A1* | 10/2020 | Srivastava | H04L 63/20 |
| 2021/0081252 | A1* | 3/2021 | Bhargava | G06F 9/5072 |
| 2021/0084031 | A1* | 3/2021 | Lao | H04L 63/0838 |
| 2021/0258329 | A1* | 8/2021 | Clayton | H04L 63/0876 |
| 2021/0297447 | A1* | 9/2021 | Crabtree | H04L 9/0643 |
| 2021/0392111 | A1* | 12/2021 | Sole | H04L 63/0236 |
| 2022/0094643 | A1* | 3/2022 | Cook | H04L 47/783 |
| 2022/0121985 | A1* | 4/2022 | Lloyd | G06F 3/0604 |

OTHER PUBLICATIONS

NPL History Search (Year: 2024).*

"OAuth 2.0 for Mobile & Desktop Apps", Retrieved from: https://developers.google.com/identity/protocols/oauth2/native-app, Nov. 3, 2021, 9 Pages.

"Using Microsoft 365 Defender to Protect Against Solorigate", Retrieved from: https://www.microsoft.com/security/blog/2020/12/28/using-microsoft-365-defender-to-coordinate-protection-against-solorigate/#/Hands-on-keyboard-activity-cloud, Dec. 28, 2020, 36 Pages.

Curwin, et al., "How to Investigate Anomaly Detection Alerts", Retrieved from: https://docs.microsoft.com/en-us/cloud-app-security/investigate-anomaly-alerts#/credential-access-alerts, Nov. 11, 2021, 27 Pages.

Curwin, et al., "Tutorial: Investigate and Remediate Risky OAuth Apps", Retrieved from: https://docs.microsoft.com/en-us/cloud-app-security/investigate-risky-oauth, Nov. 11, 2021, 7 Pages.

Buck, et al., "OAuth App Policies", Retrieved from: https://github.com/MicrosoftDocs/CloudAppSecurityDocs/blob/master/CloudAppSecurityDocs/app-permission-policy.md, Retrieved on: Nov. 16, 2021, 4 Pages.

Clarke, et al., "Oauth Abuse: Think Solarwinds/Solorigate Campaign with Focus on Cloud Applications", Retrieved from: https://www.proofpoint.com/us/blog/cloud-security/oauth-abuse-think-solarwindssolorigate-campaign-focus-cloud-applications, Mar. 23, 2021, 7 Pages.

Lodderstedt, et al., "OAuth 2.0 Threat Model and Security Considerations; draft - ietf- oauth- v2-threatmodel-00.txt", Retrieved From: https://tools.ietf.org/html/draft-ietf-oauth-v2-threatmodel-00, Jul. 1, 2011, 63 Pages.

"International Search Report and Written Opinion Issued in PCT Application No. PCT/US2022/029691", dated Sep. 7, 2022, 16 Pages.

* cited by examiner

ANOMALY DETECTION IN AN APPLICATION WITH DELEGATE AUTHORIZATION

CROSS-REFERENCE TO RELATED APPLICATIONS

None.

BACKGROUND

Various delegation protocols allow a user to give an application delegate access to a user resource, such as an email account, social network, and the like. OAuth and OAuth 2.0 are a commonly used authorization framework/ protocols that enable websites and web applications to request limited access to a user's account on another application. The basic OAuth process is widely used to integrate third-party functionality that requires access to certain data from a user's account. For example, an application might use OAuth to request access to a user's email contacts list so that it can suggest people to connect with.

OAuth allows the user to grant this access without exposing their login credentials to the requesting application. This means that a breach of the service with delegate access will not expose the user's credentials to the breaching party. However, the breaching party could possibly use the delegate access to gain access to user information through the delegation protocol. This type of breach is difficult to detect.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the technology described herein detect potential security breaches in delegate applications by monitoring communications received from a delegate application. A delegate application is an application that received a user delegation to a resource. The delegation may follow a delegation protocol, such as OAuth 2.0. Delegation provides limited access to a resource and is different from access. Delegation allows access to the resource server through an access token or access code provided by an authentication server, without providing credentials, such as a username and password. In addition, the delegation may limit access to only a subset of resources designated by the user.

Anomalies in the delegate application communications can indicate that the delegate application has been breached and is now being controlled by an entity other than an authorized entity. An anomaly may be a new or unusual attribute value within the delegate-application's communication. A new attribute value is an attribute value that has not been received previously from a specific delegate application or perhaps from any delegate within a tenant environment.

Any number of message attribute may be monitored and evaluated for anomalies. The attributes may be evaluated individually or in combination. In the case of a breach, the breaching party may have access to a previously issued access token, which will appear valid to the authorization server. Thus, detecting a breach by monitoring the access token may be difficult since the token should remain unchanged. However, attributes of the message associated with the access token may vary if a different computer is making the request. In particular, attributes identifying the computer of origin (i.e., the computer from which the request message originated) may change. These attributes can include an origination IP address, Internet Service Provider (ISP) identification, location, MAC address, router ID, and the like. The technology is not limited to monitoring attributes related to the computer of origin. For example, requesting information in an unusual way or registering a new user in an unusual way may result in the associated delegate application being designated as anomalous.

Initially, the anomaly detection system may a build a baseline of attribute values for a single delegate application within a single tenant. This may be described as an application-specific baseline with each delegate application having its own baseline. The technology may also use a tenant-specific baseline that is built using messages from multiple delegate applications interacting with a single tenant.

Using an ISP attribute as an example, application-specific baseline may be built by collecting the ISPs from a designated amount of request messages. A tenant ISP baseline built from the ISPs received from all delegate applications across a single tenant. When a new message is received, then the ISP of that message is compared to the application-specific baseline. If the ISP is not in the application-specific baseline, then the message may be designated as anomalous for the specific delegate application. A second step may be to compare the ISP to the tenant-specific baseline. If the ISP is anomalous to both the application-specific baseline and the tenant-specific baseline then the message may be designated as anomalous. Other attribute values may also be evaluated.

Security mitigation steps may then be taken when a message is anomalous. The security mitigation steps can include revoking the delegate application's access to the requested resource. In addition, various alarm messages may be sent to users, administrators, and others.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
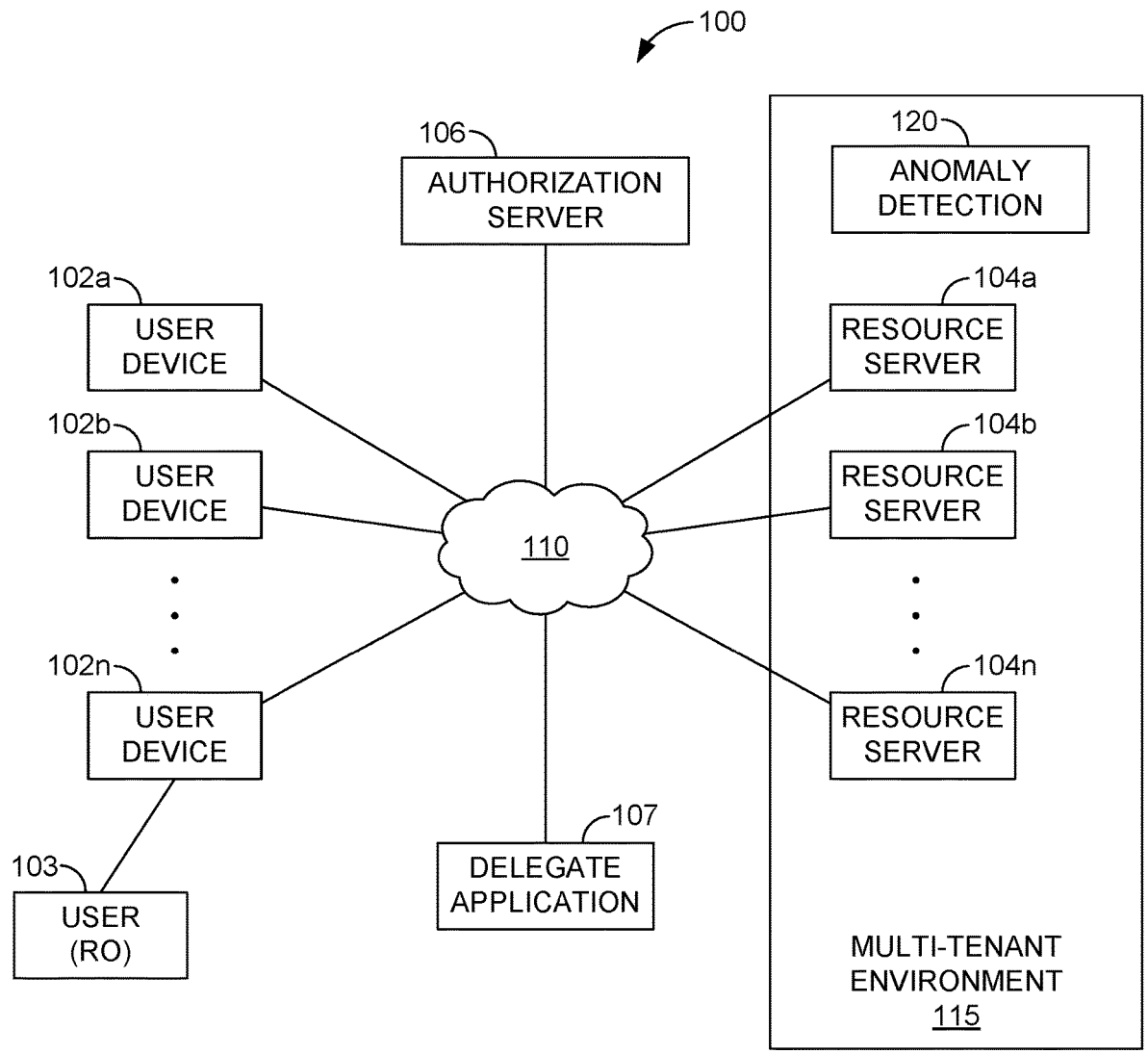
FIG. 1 is a block diagram of an example delegation environment suitable for implementations of the present disclosure.

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein detect potential security breaches in delegate applications by monitoring communications received from a delegate application. A delegate application is an application that received a user delegation to a resource server. The delegation may follow a delegation protocol, such as OAuth 2.0. Delegation provides limited access to a resource and is different from access. Delegation allows access to the resource server through an access token or access code provided by an authorization server, without providing credentials, such as a username and password. In addition, the delegation may limit access to only a subset of resources designated by the user.

Anomalies in the delegate application communications can indicate that the delegate application has been breached and is now being controlled by an entity other than an authorized entity. An anomaly may be a new or unusual attribute value within the delegate-application's communication. A new attribute value is an attribute value that has not been received previously from a specific delegate application or perhaps from any delegate within a tenant environment.

Any number of message attribute may be monitored and evaluated for anomalies. The attributes may be evaluated individually or in combination. In the case of a breach, the breaching party may have access to a previously issued access token, which will appear valid to the authorization server. Thus, detecting a breach by monitoring the access token may be difficult since the token should remain unchanged. However, attributes of the message associated with the access token may vary if a different computer is making the request. In particular, attributes identifying the computer of origin (i.e., the computer from which the request message originated) may change. These attributes can include an origination IP address, Internet Service Provider (ISP) identification, location, MAC address, router ID, and the like. In one aspect, the IP address is used to identify the ISP address through a look up from the Internet Assigned Numbers Authority (LANA) or some other source. In other aspects, the ISP address is provided in the message. The technology is not limited to monitoring attributes related to the computer of origin. For example, requesting information in an unusual way or registering a new user in an unusual way may result in the associated delegate application being designated as anomalous.

Analysis of an attribute describing a time of request may also indicate a breach when the request message is received at a time different from previous requests. Delegate applications may work on a schedule. In which case, messages should be received at approximately the same interval, time of day, or some other time consistent with a temporal pattern.

The technology described herein may be deployed in a multi-tenant environment. A multi-tenant environment refers to an architecture in which computer resources in one or more data centers serve multiple tenants. Systems designed in such manner are often called shared. A tenant is a group of users who share a common access with specific privileges to the computer resources. The anomaly detection described herein may be deployed by the operator of the multi-tenant environment and provided as a service to tenants. In other aspects, the technology may be deployed by individual tenants.

Initially, the anomaly detection system may a build a baseline of attribute values for a single delegate application within a single tenant. This may be described as an application-specific baseline with each delegate application having its own baseline. The technology may also use a tenant-specific baseline that is built using messages from multiple delegate applications interacting with a single tenant.

Using an ISP attribute as an example, application-specific baseline may be built by collecting the ISPs from a designated amount of request messages. The designated amount may be a thousand, 10,000 or some other value. In one aspect, ISPs from the last designated amount of messages are stored with old ISPs being removed from the list as new messages are received. Instead of a designated amount, a time period, such as a month, may be used to define a baseline. A tenant ISP baseline built from the ISPs received from all delegate applications across a single tenant.

When a new message is received, then the ISP of that message is compared to the application-specific baseline. If the ISP is not in the application-specific baseline, then the message may be designated as anomalous for the specific delegate application. A second step may be to compare the ISP to the tenant-specific baseline. If the ISP is anomalous to both the application-specific baseline and the tenant-specific baseline then the message may be designated as anomalous.

Security mitigation steps may then be taken when a message is anomalous. The security mitigation steps can include revoking the delegate application's access to the requested resource. In addition, various alarm messages may be sent to users, administrators, and others.

Having briefly described an overview of aspects of the technology described herein, an exemplary operating environment in which aspects of the technology described herein may be implemented is described below in order to provide a general context for various aspects.

Turning now to FIG. 1, a block diagram is provided showing an example delegation environment 100 in which some aspects of the present disclosure may be employed. The components will be described using terms from delegation protocol OAuth 2.0, but the technology is not limited for use with this protocol. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example delegation environment 100 includes a number of user devices, such as user devices 102a and 102b through 102n; a user (resource owner) 103; a number of resource servers, such as resource servers 104a and 104b through 104n; authorization server 106; delegate application 107; Multi-tenant environment; anomaly detection component 120; and network 110. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n may be client devices on the client-side of delegation environment 100, while server 106 may be on the server-side of delegation environment 100. Though not shown, a delegate application 107 may run on a user device. The user 103 may delegate access through an interface on the user device 102. User devices 102a and 102b through 102n may comprise any type of computing device capable of use by a user. For example, in one aspect, user devices 102a through 102n may be the type of computing device described in relation to FIG. 7 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The user (resource owner) 103 may use a user device 102 to authorize an application to access their account. The application's access to the user's account is limited to the "scope" of the authorization granted (e.g. read or write access).

The authorization server 106 verifies the identity of the user then issues access tokens to the application. Authorization server 106 may comprise server-side software designed to work in conjunction with client-side software on user devices 102a and 102b through 102n to implement any combination of the features and functionalities discussed in the present disclosure. For example, the authorization server 106 may grant access tokens and authenticate previously issued access tokens. This division of delegation environment 100 is provided to illustrate one example of a suitable environment, and there is no requirement for each implementation that any combination of server 106 and user devices 102a and 102b through 102n remain as separate entities.

Resource servers 104a and 104b through 104n may comprise data sources and/or data systems, which are configured to make data or other resources available to any of the various constituents of delegation environment 100. The resource servers 104a and 104b through 104n host the protected user accounts to which access may be delegated. For example, the data sources may comprise email servers, social media servers, calendars, or other resources. Resource servers 104a and 104b through 104n may be discrete from user devices 102a and 102b through 102n, though user devices can comprise resources, such as a contact list, to which access is delegated.

The delegate application 108 wants to access the user's account. Before it may do so, it must be authorized by the user, and the authorization must be validated by the Authorization server 106. Typically, the delegate application 108 will provide a service to the user, such as generating a reminder from emails or texts. The service may use information from the user's account or other resource.

The multi-tenant environment 115 hosts the resource servers 104a and 104b and the anomaly detection component 120. The multi-tenant environment 115 comprises computer resources in one or more data centers that serve multiple tenants. A tenant is a group of users who share a common access with specific privileges to the computer resources. The anomaly detection component 120 may be deployed by the operator of the multi-tenant environment and provided as a service to tenants.

Figure 2:
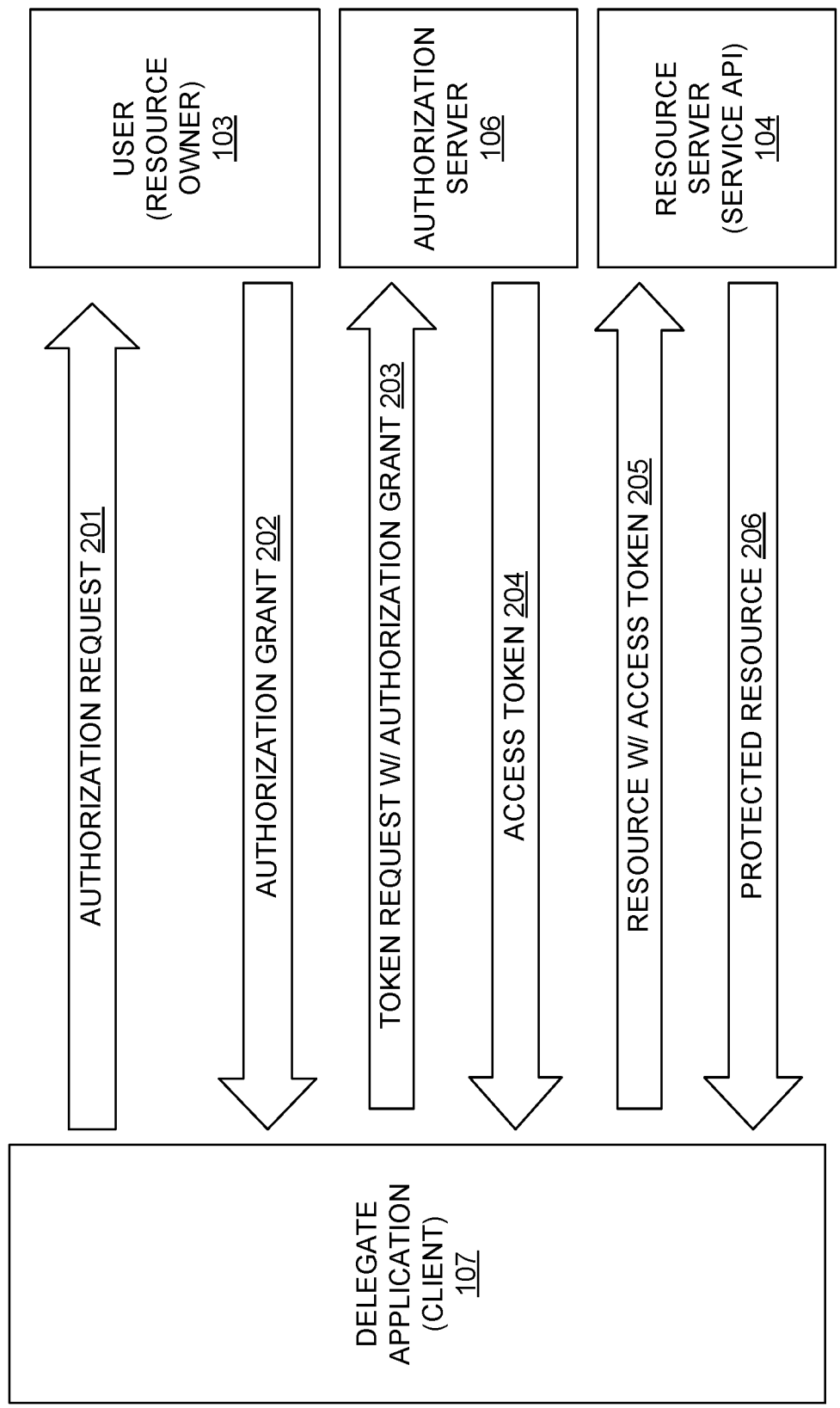
FIG. 2 is a sequence diagram illustrating communications occurring between an delegate application and other applications, in accordance with an aspect of the technology described herein.

Referring now to FIG. 2, with FIG. 1, a block diagram is provided showing example communications between components of a delegation environment 100. These are just one example of communications that might occur in a delegation environment 100. Actual implementations in the real world may vary. In general, the messages grant delegation and then use the granted delegation to request a resource. Initially, the delegate application 107 requests authorization to access service resources from the resource owner 103 by sending an authorization request 201 to the resource owner 103. The use may grant access via a user interface provided by a web browser or some other application. The access may specify specific resources the delegate application 107 is able to access via the delegation. If the resource owner 103 authorized the request, then the delegate application 107 receives an authorization grant 202. The delegate application 107 requests an access token from the authorization server 106 by presenting authentication of its own identity, and the authorization grant in an access token request 203. If the application identity is authenticated and the authorization grant is valid, the authorization server 106 issues an access token 204 to the delegate application 107. This completes the delegation process.

The delegate application 107 is then able to request the resource from the resource server 104 via a resource request message 205 and presents the access token for authentication. If the access token is valid, the resource server 104 serves the resource to the delegate application 107. Aspects of the technology described herein may evaluate the resource request message 205 to build a baseline and look for anomalies.

Figure 3:
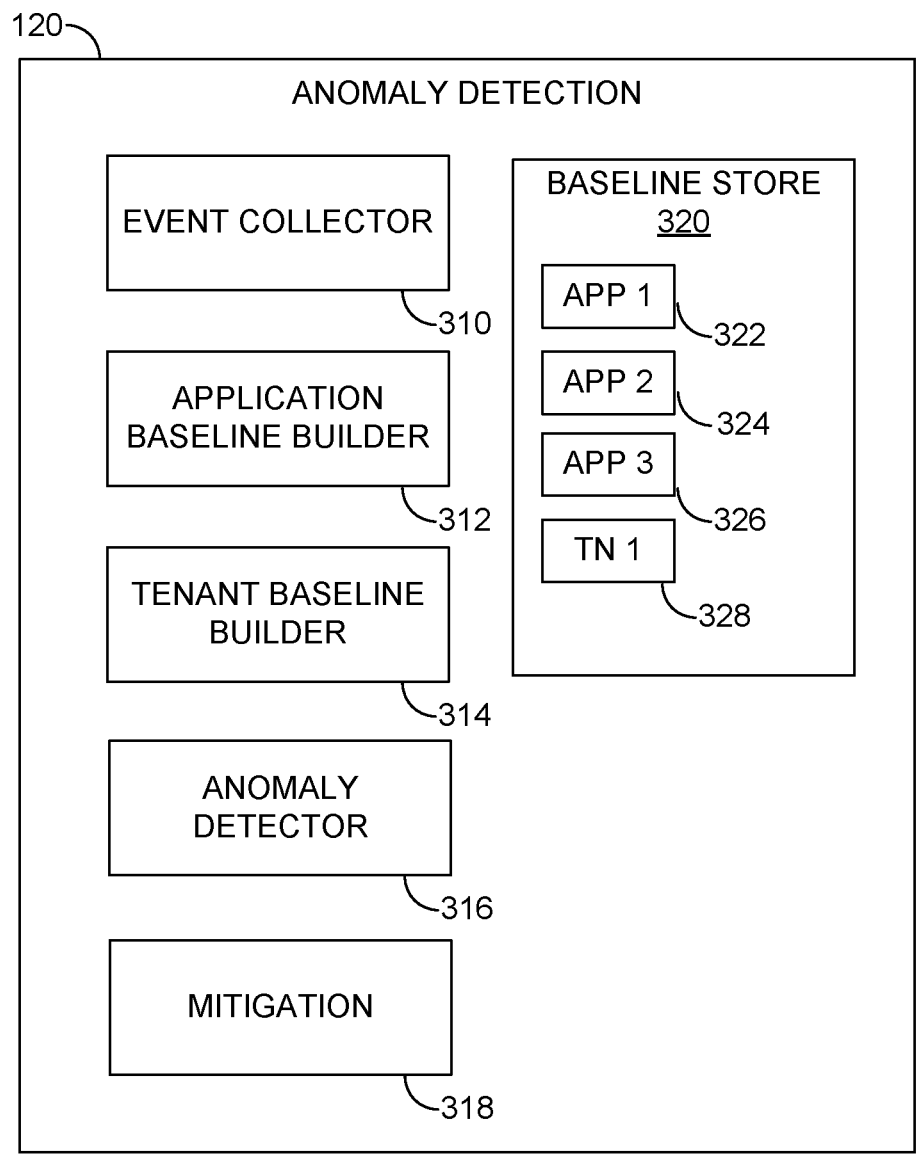
FIG. 3 is a diagram depicting an example anomaly detection system suitable for implementing aspects of the present disclosure.

Turning now to FIG. 3, an anomaly detection system 120 is shown. Example anomaly detection system 120 includes event collector 310, application-baseline builder 312, tenant-baseline builder 314, anomaly detector 316, mitigation component 318, and baseline store 320 (and its components 322, 324, 326, and 328). These components may be embodied as a set of compiled computer instructions or functions, program modules, computer software services, or an arrangement of processes carried out on one or more computer systems, such as computing device 700 described in connection to FIG. 7, for example.

In one aspect, the functions performed by components of anomaly detection system 120 are associated with one or more applications, services, or routines. In particular, such applications, services, or routines may operate on one or more user devices (such as user device 102a), servers (such as authorization server 106), may be distributed across one or more user devices and servers, or be implemented in the cloud. Moreover, in some aspects, these components of anomaly detection system 120 may be distributed across a network, including one or more servers (such as authorization server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Event collector 310 identifies resource request messages sent by a delegate application. The resource request messages may be identified in an event stream that includes event notices for a large number of actions occurring within the multi-tenant environment 115 or other arena. The messages may be used by the application-baseline builder 312 and a tenant-baseline builder 314 to identify baseline patterns in values for different attributes of the messages. The messages may also be communicated to the anomaly detector 316 for anomaly analysis.

Application-baseline builder 312 analyzes a plurality of resource request messages and identifies baseline values for different attributes of interest in the messages. Initially, the application-baseline builder 312 may sort messages by receiving application. The attributes of interest are those likely to reveal an anomaly resulting from a security breach. Attributes that can be easily manipulated by a sender may be less desirable as attributes of interest than those that the sender is unable to spoof or otherwise control. In one aspect, various attributes that identify the computer of origin may be baselined. These attributes include a sending location, IP address, ISP, device type, name of the browser, and name of the user agent. Some of these attributes are defined as message attributes of the resource request message according to various delegation protocol. Other attributes values may be derived through analysis of data included in various network communication layers. Other attribute values may be based on attributes of the resource request message. For example, an IP address can be used to look up and ISP.

In one embodiment, the application baseline includes all attribute values for a particular attribute found in a threshold amount of resource request messages or messages received during a threshold time. For example, the baseline for the location attribute could be all locations provided in resource request messages over the last 30 days. The baseline can be a rolling baseline with values aging out of the baseline after 30 days. As an alternative, analysis could be performed based on location data to identify general areas from which resource request messages should be considered normal. Thus, the locations could be distilled to a country of origin or other bounded geographic division. Messages then received from locations outside of the country or greed geographic divisions could be deemed anomalous by the anomaly detector 316.

The baseline for an ISP attribute value could be all ISPs provided in resource request messages, or derived from the message's IP address or other content, over a threshold amount of messages or time. When messages received from an ISP outside of the baseline group, the anomaly detector 316 may find the message anomalous. IP addresses could work in a similar fashion.

In another embodiment, the baseline is based on a pattern recognized in the attribute values of resource request messages. For example, a temporal pattern could be recognized by analyzing the time a resource request messages sent and/or received. In general, delegate applications may follow a temporal pattern when requesting access to resources. This can be a strong anomaly detection signal in applications that follow a temporal pattern.

Tenant-baseline builder 314 builds baselines for a tenant, which can include resource request messages seeking content from multiple delegate applications. The tenant baseline building works the same as the baseline building for applications, except that the input source is different and includes attribute values from resource request messages received from multiple delegate applications.

Anomaly detector 316 compares an attribute value in a newly received resource request message to application baselines and tenant baselines. Multiple attribute values may be compared to baselines for a single message. The anomaly detector 316 may then make a determination whether the message is anomalous. When multiple values are considered, the individual anomaly scores for each attribute value may be combined in a weighted or unweighted fashion. If weighted, then weights may be based the predictive strength of an individual attribute in predicting an anomaly. The weights may be derived from a historical analysis of previous predictions and investigations into message designated as anomalous.

Mitigation component 318 performs a security mitigation upon receiving an indication that a message is anomalous. The mitigation can include an alert to an administrator or other person in a position responsible for the resource being accessed. Automated mitigations are also possible, such as revoking the access token associated with the anomalous message. In one embodiment, the delegate application that sent the anomalous message is denied access to the multi-tenant environment or at least of the specific associated with the resource request.

Baseline store 320 stores application and tenant baselines such as application one baseline 322, application to baseline 324, application three baseline 326, and tenant one baseline 328. These baselines may be accessed by the anomaly detector 316 and compared to attribute values of a newly received message, as described previously.

Exemplary Methods

Figure 4:
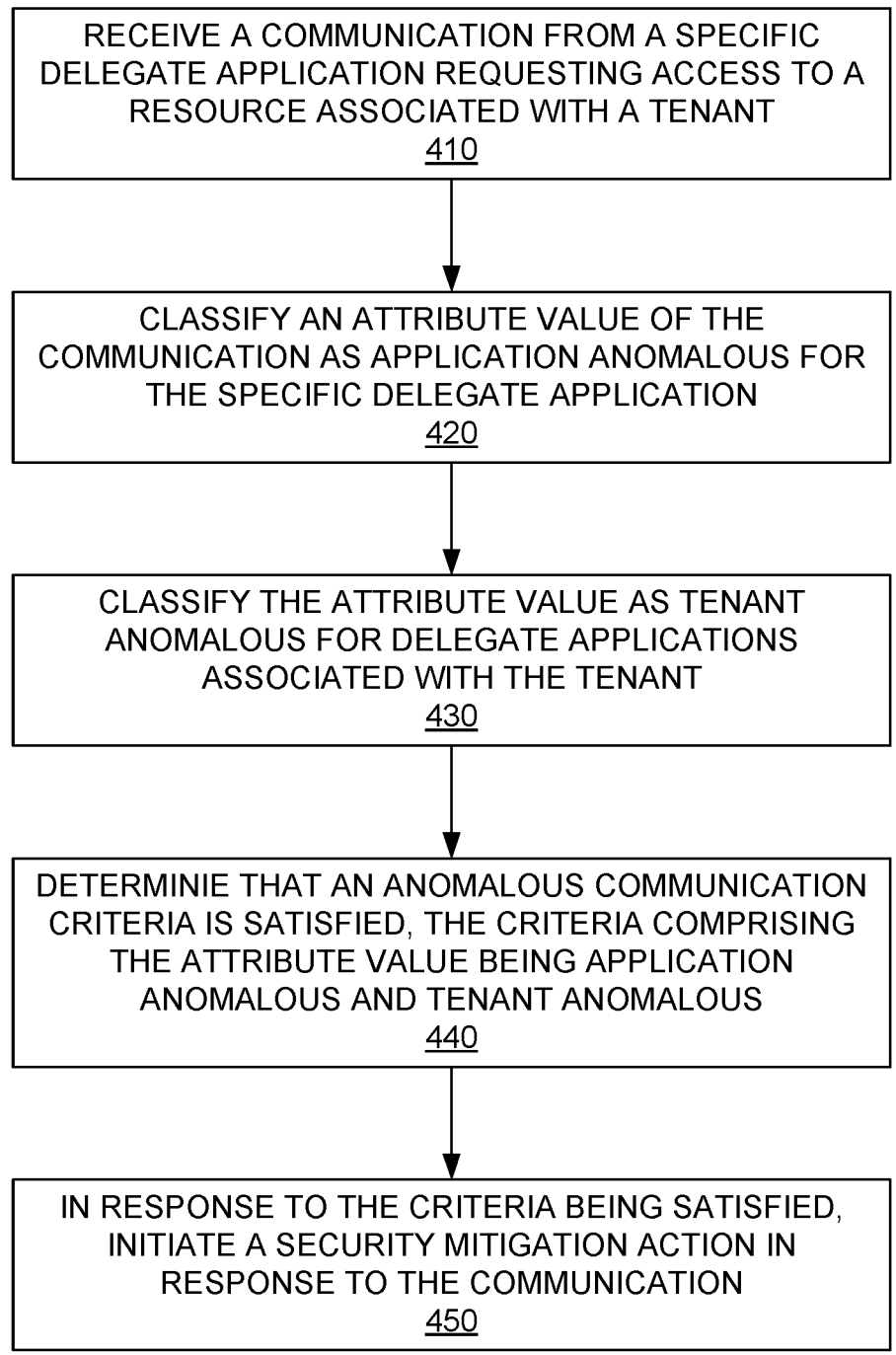
FIG. 4 is a flowchart of a method for detecting an anomaly in a delegate application's communication, in accordance with an aspect of the technology described herein.
Figure 5:
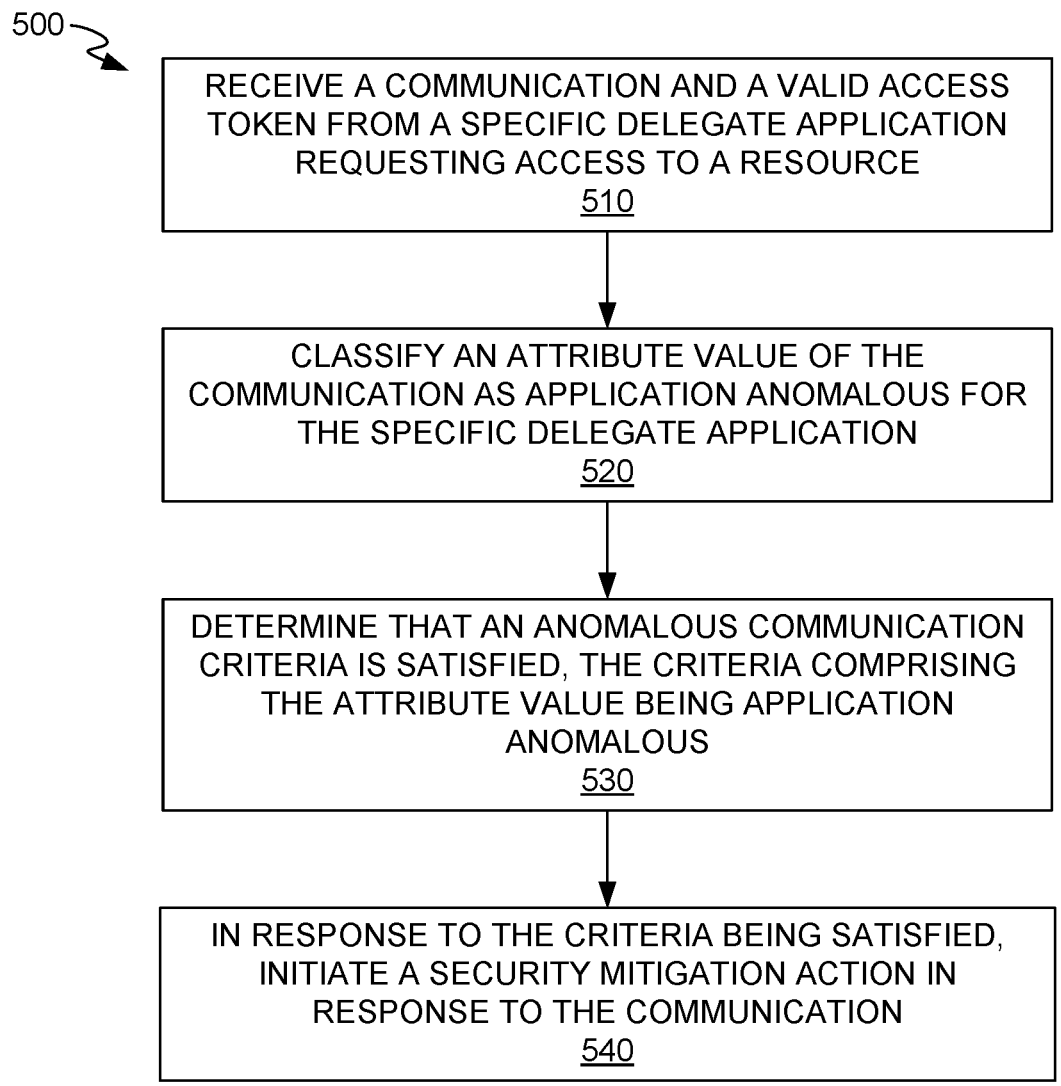
FIG. 5 is a flowchart of a method for detecting an anomaly in a delegate application's communication, in accordance with an aspect of the technology described herein.
Figure 6:
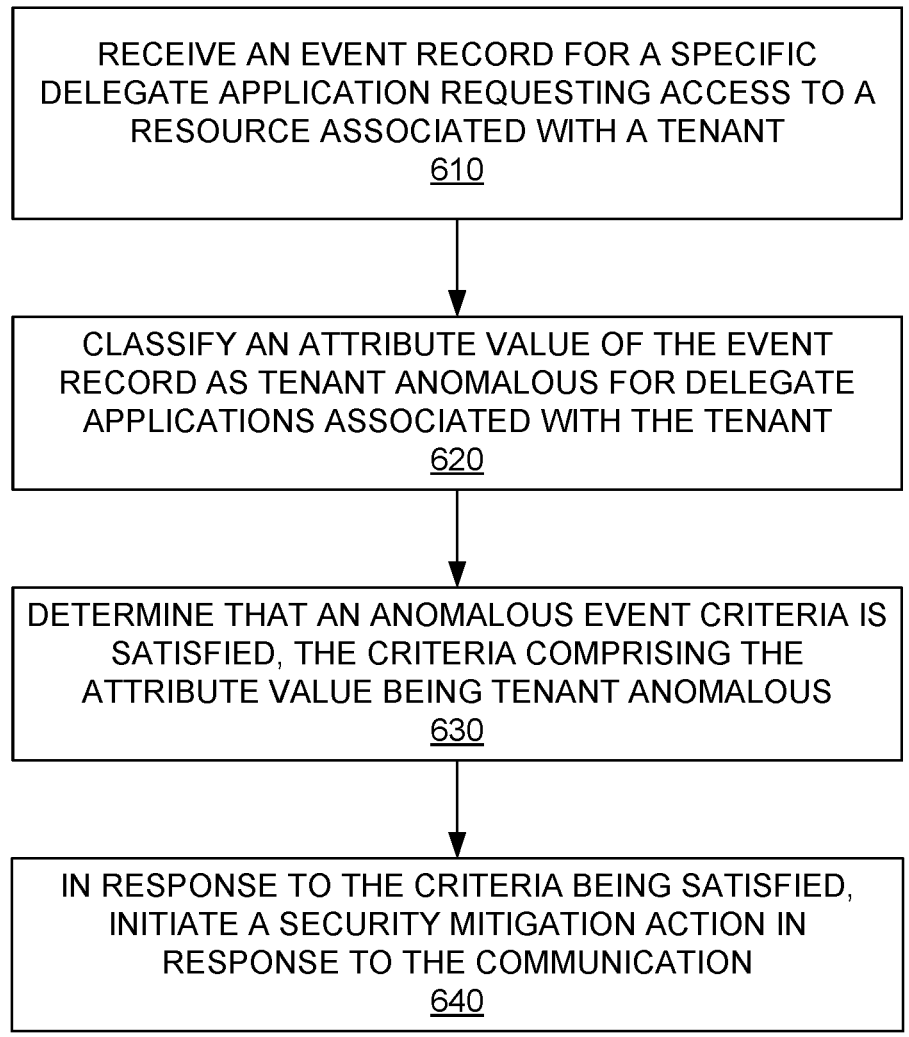
FIG. 6 is a flowchart of a method for detecting an anomaly in a delegate application's communication, in accordance with an aspect of the technology described herein.

Now referring to FIGS. 4-6, each block of methods 400, 500, and 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 400, 500, and 600 are described, by way of example, with respect to the anomaly detection system 120 of FIG. 3 and additional features of FIGS. 1 and 2. However, these methods may additionally or alternatively be executed by any one system, or any combination of systems, including, but not limited to, those described herein.

FIG. 4 is a flow diagram showing a method 400 for anomaly detection in a message received from a delegate application, in accordance with some embodiments of the present disclosure. Method 400 could be performed on or with systems similar to those described with reference to FIGS. 1, 2, and 3.

The method 400, at block 410 includes receiving a communication from a specific delegate application requesting access to a resource associated with a tenant. The communication can be a resource request message seeking access to a resource on a resource server. The resource can be associated with a tenant. The communication can be associated with a valid access token providing proof of delegate access to the requested resource.

The method 400, at block 420 includes classifying an attribute value of the communication as application anomalous for the specific delegate application. As described previously, the attribute value may be anomalous when it is not found within an application-specific baseline or is not consistent with a pattern defined within the tenant baseline.

The method 400, at block 430 includes classifying the attribute value as tenant anomalous for delegate applications associated with the tenant. As described previously, the attribute value may be anomalous when it is not found within a tenant baseline or is not consistent with a pattern defined within the tenant baseline.

The method 400, at block 440 includes determining that an anomalous communication criteria is satisfied, the criteria comprising the attribute value being application anomalous and tenant anomalous. Tenant anomalous means the attribute value is found be anomalous when compared to a tenant baseline for the attribute. Application anomalous means the attribute value is found be anomalous when compared to an application-specific baseline for the attribute.

The method 400, at block 450 includes in response to the criteria being satisfied, initiating a security mitigation action in response to the communication. The mitigation can include an alert to an administrator or other person in a position responsible for the resource being accessed. Automated mitigations are also possible, such as revoking the access token associated with the anomalous message. In one embodiment, the delegate application that sent the anomalous message is denied access to the multitenant environment or at least of the specific associated with the resource request.

FIG. 5 is a flow diagram showing a method 500 for anomaly detection in a message received from a delegate application, in accordance with some embodiments of the present disclosure. Method 500 could be performed on or with systems similar to those described with reference to FIGS. 1, 2, and 3.

The method 500, at block 510 includes receiving a communication and a valid access token from a specific delegate application requesting access to a resource. The communication can be a resource request message seeking access to a resource on a resource server. The resource can be associated with a tenant. The communication can be associated with a valid access token providing proof of delegate access to the requested resource.

The method 500, at block 520 includes classifying an attribute value of the communication as application anomalous for the specific delegate application. As described previously, the attribute value may be anomalous when it is not found within an application-specific baseline or is not consistent with a pattern defined within the tenant baseline. In one example, the attribute value is the ISP from which a communication originated. In addition to comparing the ISP against the baseline, other criteria may be used. For example, if the ISP name is similar to a name of the delegate application, then the communication may not be classified as anomalous, even if the ISP is not within the baseline. Similarity may be determined using cosine similarity or some other method.

The method 500, at block 530 includes determining that an anomalous communication criteria is satisfied, the criteria comprising the attribute value being application anomalous. Application anomalous means the attribute value is found be anomalous when compared to an application-specific baseline for the attribute.

The method 500, at block 540 includes in response to the criteria being satisfied, initiating a security mitigation action in response to the communication. The mitigation can include an alert to an administrator or other person in a position responsible for the resource being accessed. Automated mitigations are also possible, such as revoking the access token associated with the anomalous message. In one embodiment, the delegate application that sent the anomalous message is denied access to the multitenant environment or at least of the specific associated with the resource request.

FIG. 6 is a flow diagram showing a method 600 for anomaly detection in a message received from a delegate application, in accordance with some embodiments of the present disclosure. Method 600 could be performed on or with systems similar to those described with reference to FIGS. 1, 2, and 3.

The method 600, at block 610 includes receiving an event record for a specific delegate application with access to a resource associated with a tenant. The event record indicates an action associated with the delegate application has occurred. In one aspect, the event record indicates that a user added credentials to the delegate application. The event record can include attributes about the computers, users, software (e.g., client browser) and other entities involved in the registration. If any of the attribute values from the event record fall outside of established patterns for the tenant, application, or user, then the event record may be anomalous. If the attribute value falls outside of application specific norms, then the event may be application anomalous. If the attribute value falls outside of tenant specific norms for multiple delegate applications, then the event may be tenant anomalous.

The event record can indicate a communication, such as a resource request message seeking access to a resource on a resource server. The resource can be associated with a tenant. The communication can be associated with a valid access token providing proof of delegate access to the requested resource.

The method 600, at block 620 includes classifying an attribute value as tenant anomalous for delegate applications associated with the tenant. As described previously, the attribute value may be anomalous when it is not found within a tenant baseline or is not consistent with a pattern defined within the tenant baseline.

The method 600, at block 630 includes determining that an anomalous communication criteria is satisfied, the criteria comprising the attribute value being tenant anomalous. Tenant anomalous means the attribute value is found be anomalous when compared to a tenant baseline for the attribute.

The method 600, at block 640 includes in response to the criteria being satisfied, initiating a security mitigation action in response to the communication. The mitigation can include an alert to an administrator or other person in a position responsible for the resource being accessed. Automated mitigations are also possible, such as revoking the access token associated with the anomalous message. In one embodiment, the delegate application that sent the anomalous message is denied access to the multitenant environment or at least of the specific associated with the resource request.

Exemplary Operating Environment

Figure 7:
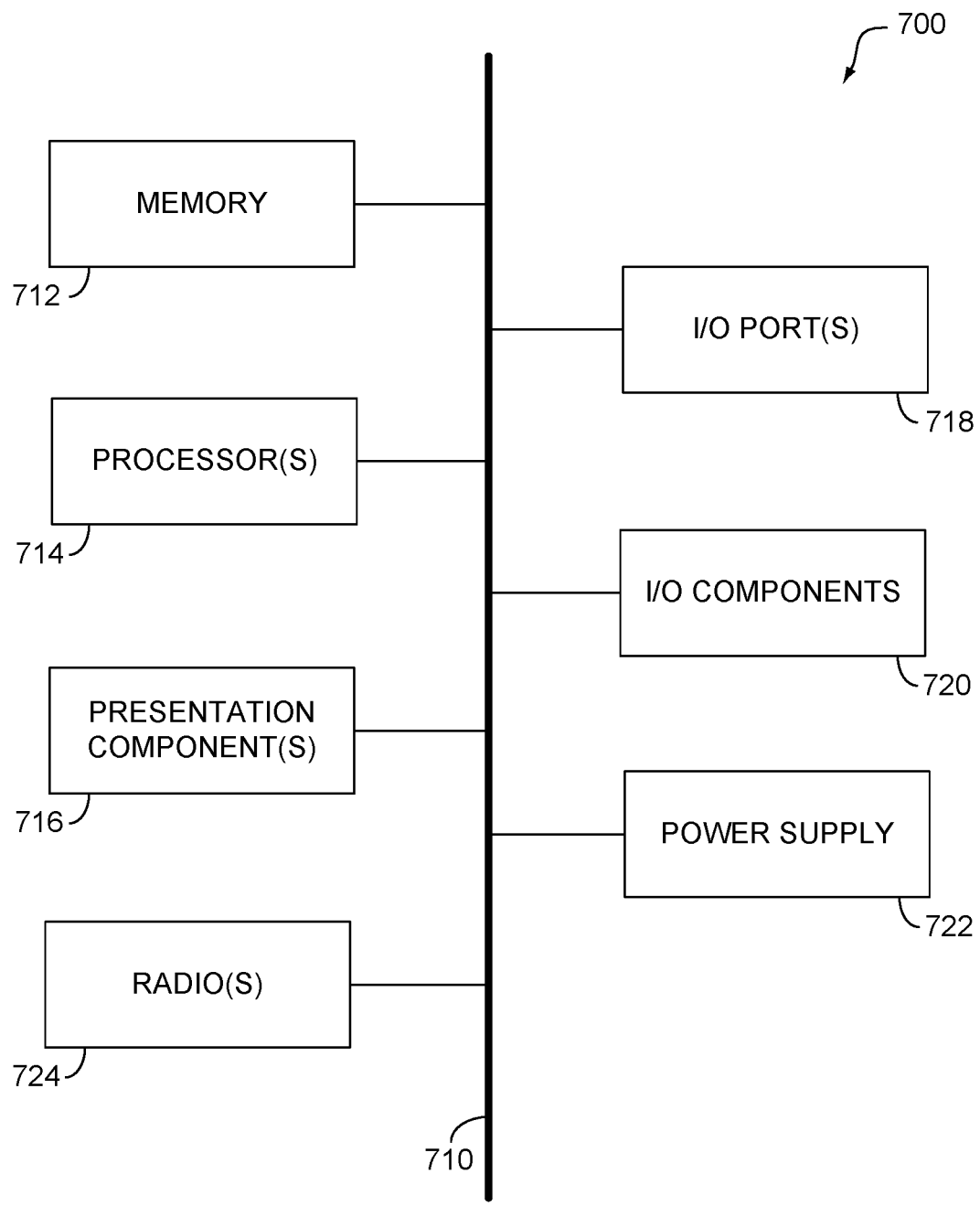
FIG. 7 is a block diagram of an exemplary computing environment suitable for use in implementing aspects of the technology described herein.

Referring to the drawings in general, and initially to FIG. 7 in particular, an exemplary operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of an exemplary computing device that may be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media may be any available media that may be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

Embodiments

EMBODIMENT 1. One or more computer storage media comprising computer-executable instructions that when executed by a computing device cause the computing device to perform a method of detecting an anomaly in a delegate application's communication. The method comprising receiving a communication from a specific delegate application requesting access to a resource associated with a tenant. The method also comprising classifying an attribute value of the communication as application anomalous for the specific delegate application. The method also comprising classifying the attribute value as tenant anomalous for delegate applications associated with the tenant. The method also comprising determining that an anomalous communication criteria is satisfied, the criteria comprising the attribute value being application anomalous and tenant anomalous. The method also comprising, in response to the criteria being satisfied, initiating a security mitigation action in response to the communication. The security mitigation may prevent the unauthorized access to and use of private data. Previously, security methods did not evaluate the actions of delegate applications.

EMBODIMENT 2. The media of embodiment 1, wherein the attribute value is an internet service provider.

EMBODIMENT 3. The media as in any preceding embodiment, wherein the method further comprises determining a similarity mismatch between a name of the internet service provider and a name of the specific delegate application, wherein the criteria further comprises the similarity mismatch.

EMBODIMENT 4. The media as in any preceding embodiment, wherein the attribute value is a location.

EMBODIMENT 5. The media as in any preceding embodiment, wherein the attribute value is a time of the communication.

EMBODIMENT 6. The media as in any preceding embodiment, wherein the method further comprises building an application-specific baseline for the attribute value from communications received from the specific delegate application.

EMBODIMENT 7. The media as in any preceding embodiment, wherein the security mitigation action is revoking permission for the specific delegate application to access resources in a tenant environment.

EMBODIMENT 8. A method of detecting an anomaly in a delegate application's communication. The method comprising receiving a communication and a valid access token from a specific delegate application requesting access to a resource. The method also comprising classifying an attribute value of the communication as application anomalous for the specific delegate application. The method also comprising determining that an anomalous communication criteria is satisfied, the criteria comprising the attribute value being application anomalous. The method also comprising in response to the criteria being satisfied, initiating a security mitigation action in response to the communication. The security mitigation may prevent the unauthorized access to and use of private data. Previously, security methods did not evaluate the actions of delegate applications EMBODIMENT 9. The method as in any preceding embodiment, wherein the attribute value is an ISP.

EMBODIMENT 10. The method as in any preceding embodiment, wherein the criteria is a weighted combination of multiple attributes being anomalous or not anomalous.

EMBODIMENT 11. The method as in any preceding embodiment, wherein the attribute value comprises one of a device type, name of a browser, and name of a user agent.

EMBODIMENT 12. The method of embodiment 8, further comprising classifying the attribute value of the communication as anomalous for a tenant associated with the resource.

EMBODIMENT 13. The method as in any preceding embodiment, wherein the method further comprises building a tenant-specific baseline for the attribute value from communications received from multiple delegate applications attempting to access a tenant resource.

EMBODIMENT 14. The method as in any preceding embodiment, wherein the attribute value is a time of the communication.

EMBODIMENT 15. The method as in any preceding embodiment, wherein the security mitigation action is revoking the valid access token.

EMBODIMENT 16. A system comprising one or more processors and one or more computer storage media storing computer-useable instructions that, when used by the one or more processors, cause the one or more processors to perform a method. The method comprising receiving an event record for a specific delegate application with access to a resource associated with a tenant. The method also comprising classifying an attribute value of the event record as tenant anomalous for delegate applications associated with the tenant. The method also comprising determining that an anomalous event criteria is satisfied, the criteria comprising the attribute value being tenant anomalous. The method also comprising, in response to the criteria being satisfied, initiating a security mitigation action in response to the communication. The security mitigation may prevent the unauthorized access to and use of private data. Previously, security methods did not evaluate the actions of delegate applications.

EMBODIMENT 17. The system of embodiment 16, wherein the attribute value is an ISP from which a communication requesting information the resource is received.

EMBODIMENT 18. The system of embodiment 17, wherein the method further comprises determining a similarity mismatch between a name of the ISP and a name of the specific delegate application, wherein the criteria further comprises the similarity mismatch.

EMBODIMENT 19. The system as in any one of embodiment 16, 17, and 18, wherein the method further comprises building a tenant-specific baseline for the attribute value from event records received from multiple delegate applications.

EMBODIMENT 20. The system as in any one of embodiment 16, 17, 18, and 19, wherein the security mitigation action is denying access to the resource.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device cause the computing device to perform a method of detecting an anomaly in a delegate application's communication, comprising:
   generating a tenant-specific baseline for an attribute value based on information included in event records received from multiple delegate applications;
   generating an application-specific baseline for the attribute value based on information included in communications received from the multiple delegate applications;
   receiving a communication from a specific delegate application requesting access to a resource associated with a tenant;
   generating a first classification of the attribute value of the communication as application anomalous for the specific delegate application based on the application-specific baseline;
   generating a second classification of the attribute value as tenant anomalous for delegate applications associated with the tenant based on the tenant-specific baseline;
   determining that an anomalous communication criteria is satisfied based on the first classification and the second classification; and
   in response to the criteria being satisfied, initiating a security mitigation action in response to the communication.

2. The media of claim 1, wherein the attribute value is an internet service provider.

3. The media of claim 2, wherein the method further comprises determining a similarity mismatch between a name of the internet service provider and a name of the specific delegate application, wherein the criteria further comprises the similarity mismatch.

4. The media of claim 1, wherein the attribute value is a location.

5. The media of claim 1, wherein the attribute value is a time of the communication.

6. The media of claim 1, wherein generating the application-specific baseline further comprises collecting internet service provider information included in the communications.

7. The media of claim 1, wherein the security mitigation action is revoking permission for the specific delegate application to access resources in a tenant environment.

8. A method of detecting an anomaly in a delegate application's communication, comprising:
   receiving a communication and a valid access token from a specific delegate application requesting access to a resource;
   building a tenant-specific baseline for an attribute value from communications received from multiple delegate applications attempting to access a tenant resource
   classifying the attribute value of the communication as application anomalous for the specific delegate application based on the tenant-specific baseline;
   determining that an anomalous communication criteria is satisfied, the criteria comprising the attribute value being application anomalous; and
   in response to the criteria being satisfied, initiating a security mitigation action in response to the communication.

9. The method of claim 8, wherein the attribute value is an internet service provider.

10. The method of claim 8, wherein the criteria is a weighted combination of multiple attributes being anomalous or not anomalous.

11. The method of claim 8, wherein the attribute value comprises one of a device type, name of a browser, and name of a user agent.

12. The method of claim 8, further comprising classifying the attribute value of the communication as anomalous for a tenant associated with the resource.

13. The method of claim 12, wherein building the tenant-specific baseline further comprises identifying a patterns in values for a set of attributes from the communications.

14. The method of claim 8, wherein the attribute value is a time of the communication.

15. The method of claim 8, wherein the security mitigation action is revoking the valid access token.

16. A system comprising:
   one or more processors; and
   one or more computer storage media storing computer-useable instructions that, when used by the one or more processors, cause the one or more processors to perform a method, the method comprising:
      determining a tenant-baseline for an attribute value from event records received from a set of delegate applications;
      receiving an event record for a specific delegate application with access to a resource associated with a tenant, where the specific delegate application is a member of the set of delegate applications;
      classifying, based on the tenant-baseline, the attribute value of the event record as tenant anomalous for delegate applications associated with the tenant;

determining that an anomalous event criteria is satisfied, the criteria comprising the attribute value being tenant anomalous; and in response to the criteria being satisfied, initiating a security mitigation action in response to the communication.

17. The system of claim 16, wherein the attribute value is an internet service provider from which a communication requesting information the resource is received.

18. The system of claim 17, wherein the method further comprises determining a similarity mismatch between a name of the internet service provider and a name of the specific delegate application, wherein the criteria further comprises the similarity mismatch.

19. The system of claim 16, wherein the determining the tenant baseline further comprises identifying a pattern associated with the attribute value from event records.

20. The system of claim 19, wherein the security mitigation action is denying access to the resource.

* * * * *

UNITED STATES PATENT AND TRADEMARK OFFICE
CERTIFICATE OF CORRECTION

| | | |
|---|---|---|
| PATENT NO. | : 12,010,125 B2 | Page 1 of 1 |
| APPLICATION NO. | : 17/361650 | |
| DATED | : June 11, 2024 | |
| INVENTOR(S) | : Tal Joseph Maor et al. | |

It is certified that error appears in the above-identified patent and that said Letters Patent is hereby corrected as shown below:

On the Title Page

Please update the inventors residences under item (72) as indicated below:
Idan Brusilovsky, Tel-Aviv "(IS)" with --(IL)--
Amir Ben Ami, Nehalim "(IS)" with --(IL)--
Amos Avraham Rimon, Tel-Aviv "(IS)" with --(IL)--
Adi Rose Lefkowitz, Tel-Aviv "(IS)" with --(IL)--

Signed and Sealed this
Twenty-sixth Day of August, 2025

Coke Morgan Stewart
*Acting Director of the United States Patent and Trademark Office*